US011119707B2

(12) United States Patent
Uruma

(10) Patent No.: US 11,119,707 B2
(45) Date of Patent: Sep. 14, 2021

(54) PRINTING APPARATUS, CONTROL METHOD AND STORAGE MEDIUM TO ISSUE CERTIFICATE SIGNING REQUEST (CSR) AND REGISTER THE PRINTING APPARATUS

(71) Applicant: CANON KABUSHIKI KAISHA, Tokyo (JP)

(72) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/984,689

(22) Filed: Aug. 4, 2020

(65) Prior Publication Data
US 2021/0064299 A1 Mar. 4, 2021

(30) Foreign Application Priority Data
Aug. 28, 2019 (JP) .............................. JP2019-155426

(51) Int. Cl.
*G06F 3/12* (2006.01)

(52) U.S. Cl.
CPC .......... *G06F 3/1204* (2013.01); *G06F 3/1238* (2013.01); *G06F 3/1253* (2013.01); *G06F 3/1287* (2013.01); *G06F 3/1285* (2013.01)

(58) Field of Classification Search
None
See application file for complete search history.

(56) References Cited

U.S. PATENT DOCUMENTS

| 10,193,871 | B2 * | 1/2019 | Asano | H04L 9/3265 |
| 2011/0047373 | A1 * | 2/2011 | Karasawa | G06F 21/33 713/156 |
| 2012/0023327 | A1 * | 1/2012 | Nagasaki | H04L 63/0823 713/156 |
| 2013/0061041 | A1 * | 3/2013 | Inoue | G06F 21/44 713/156 |
| 2014/0289817 | A1 * | 9/2014 | Matsushima | G06F 3/1454 726/4 |
| 2017/0155626 | A1 * | 6/2017 | Li | H04L 63/0428 |
| 2018/0241574 | A1 * | 8/2018 | Kakutani | H04L 9/3247 |
| 2018/0335990 | A1 * | 11/2018 | Nishikawa | G06F 21/608 |

FOREIGN PATENT DOCUMENTS

JP  2013-041552 A  2/2013

* cited by examiner

*Primary Examiner* — Haris Sabah
(74) *Attorney, Agent, or Firm* — Canon U.S.A., Inc. IP Division

(57) ABSTRACT

A printing apparatus includes a transmission unit configured to transmit a request to register the printing apparatus and a signing request necessary to issue a certificate of the printing apparatus to a system upon receiving a registration instruction for registering the printing apparatus with a print service from a user. A display unit refrains from displaying third display information for identifying the signing request transmitted by the transmission unit.

10 Claims, 17 Drawing Sheets

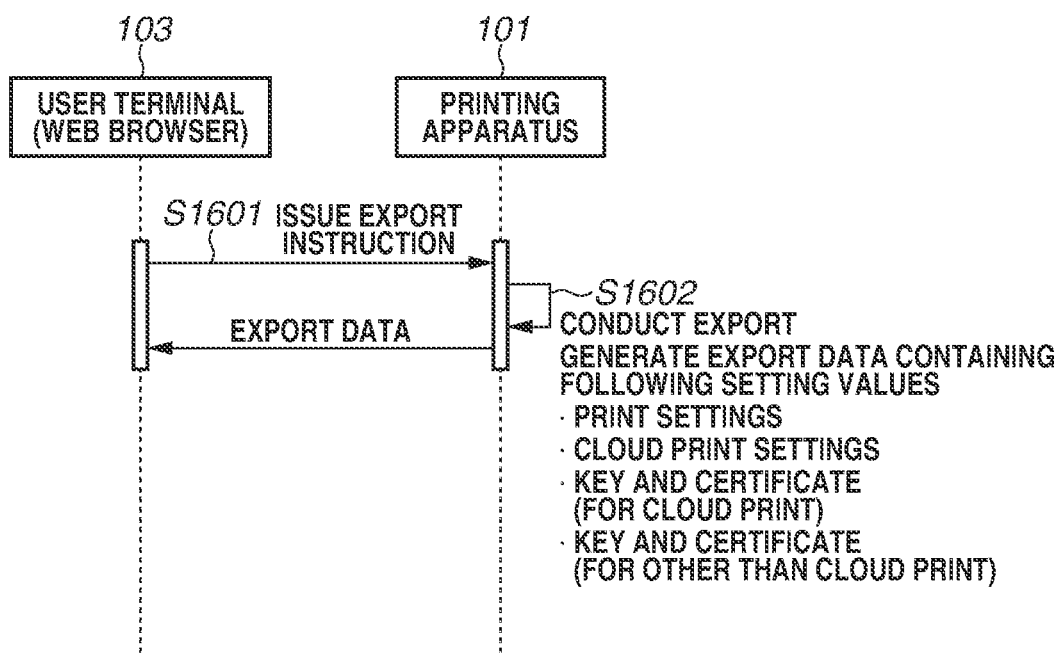

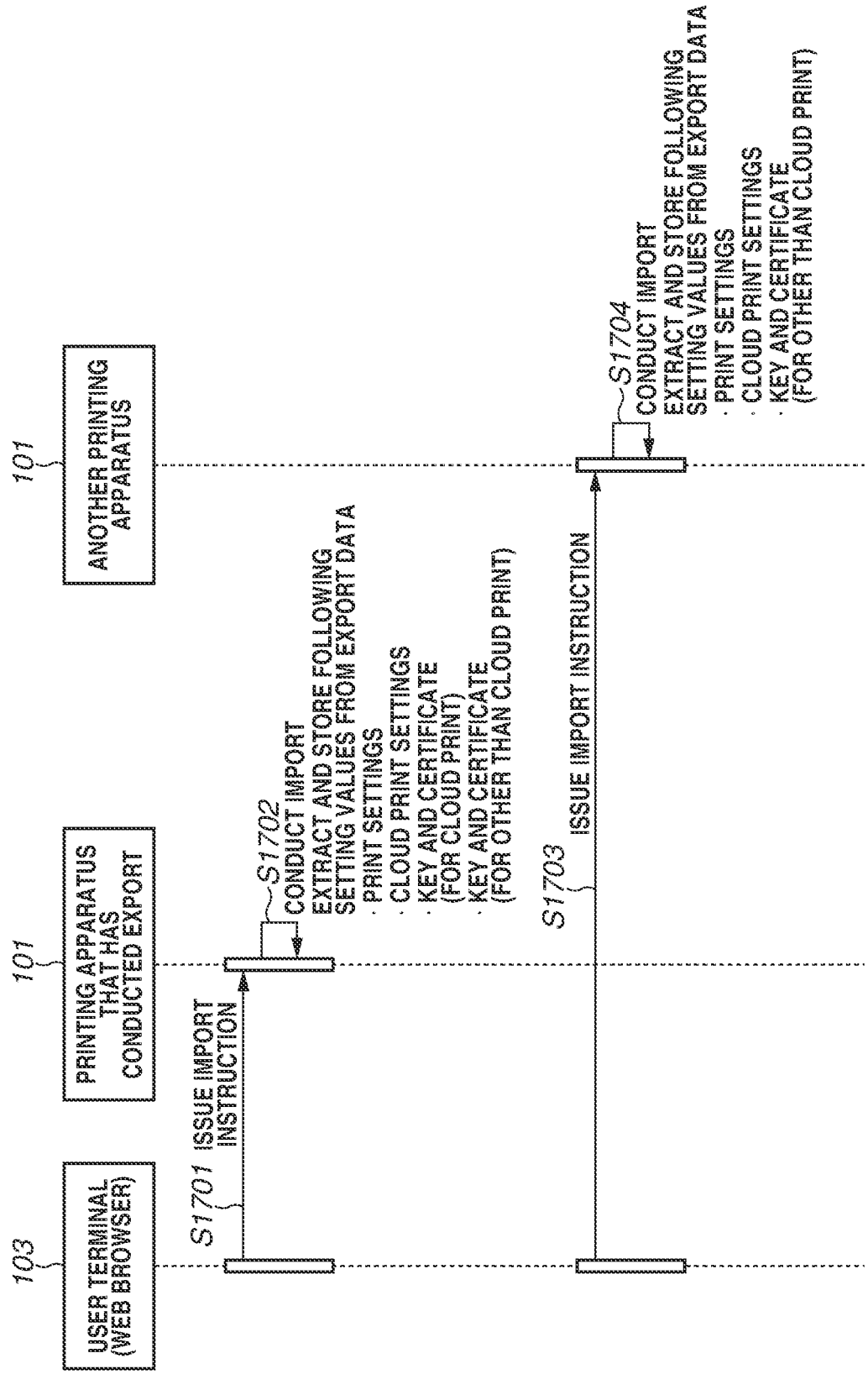

PRINTING APPARATUS, CONTROL METHOD AND STORAGE MEDIUM TO ISSUE CERTIFICATE SIGNING REQUEST (CSR) AND REGISTER THE PRINTING APPARATUS

BACKGROUND

Field of the Disclosure

The present disclosure relates to a printing apparatus, a control method, and a storage medium.

Description of the Related Art

There has been known a cloud print service. In the cloud print service, a printing apparatus is registered with a print service provided by a server in the Internet, and the printing apparatus receives a print job output in response to an instruction from a client via the cloud service and carries out printing. To cooperate with the cloud print service, the printing apparatus needs to include a mechanism for cooperating with the cloud print service.

When the printing apparatus is registered with the cloud print service, an owner of the printing apparatus needs to perform an operation of logging in to the cloud print service using a web browser on the client and permitting the registration after requesting the registration with the cloud print service via the printing apparatus.

Further, there is known a method of using a client certificate for certifying the printing apparatus when the printing apparatus uses a cloud service. The client certificate is used for the cloud service to authenticate the printing apparatus in communication with the cloud service (refer to Japanese Patent Application Laid-Open No. 2013-41552).

SUMMARY

According to embodiments of the present disclosure, a printing apparatus includes a communication unit configured to communicate with a system including a print service that provides a service regarding printing via the Internet, a display unit configured to display first display information for identifying a signing request necessary to issue a certificate and second display information for identifying the issued certificate, and a transmission unit configured to transmit a request to register the printing apparatus and the signing request necessary to issue the certificate of the printing apparatus to the system upon receiving a registration instruction for registering the printing apparatus with the print service from a user. The display unit refrains from displaying third display information for identifying the signing request transmitted by the transmission unit.

Further features of the present disclosure will become apparent from the following description of exemplary embodiments with reference to the attached drawings.

BRIEF DESCRIPTION OF THE DRAWINGS

FIG. 16 is a sequence diagram illustrating a sequence of the setting value export.

FIG. 17 is a sequence diagram illustrating a sequence of the setting value import.

DESCRIPTION OF THE EMBODIMENTS

Communication using the client certificate is also possibly employed in cooperation between a cloud print service and a printing apparatus. In this case, the printing apparatus is assumed to be configured to generate a certificate signing request (CSR) necessary to issue the client certificate to register the client certificate with the printing apparatus. The CSR is a message format of a request to sign a certificate transmitted from an applicant to a certificate authority (or a certificate issuing server 104) to apply for a public key certificate.

When CSRs are displayed on a user interface, the CSR for the cloud print may be undesirably displayed. This may impair usability for a user wanting to register a certificate for a purpose other than the cloud print.

Embodiments of the present disclosure provide a method for improving the usability of the user interface regarding the CSR of the printing apparatus to be registered with the cloud print service. Embodiments of the present disclosure enable reduced time and effort of the user regarding the handling of the certificate as a result thereof.

In the following description, exemplary embodiments of the disclosure are described with reference to the drawings.

Figure 1:
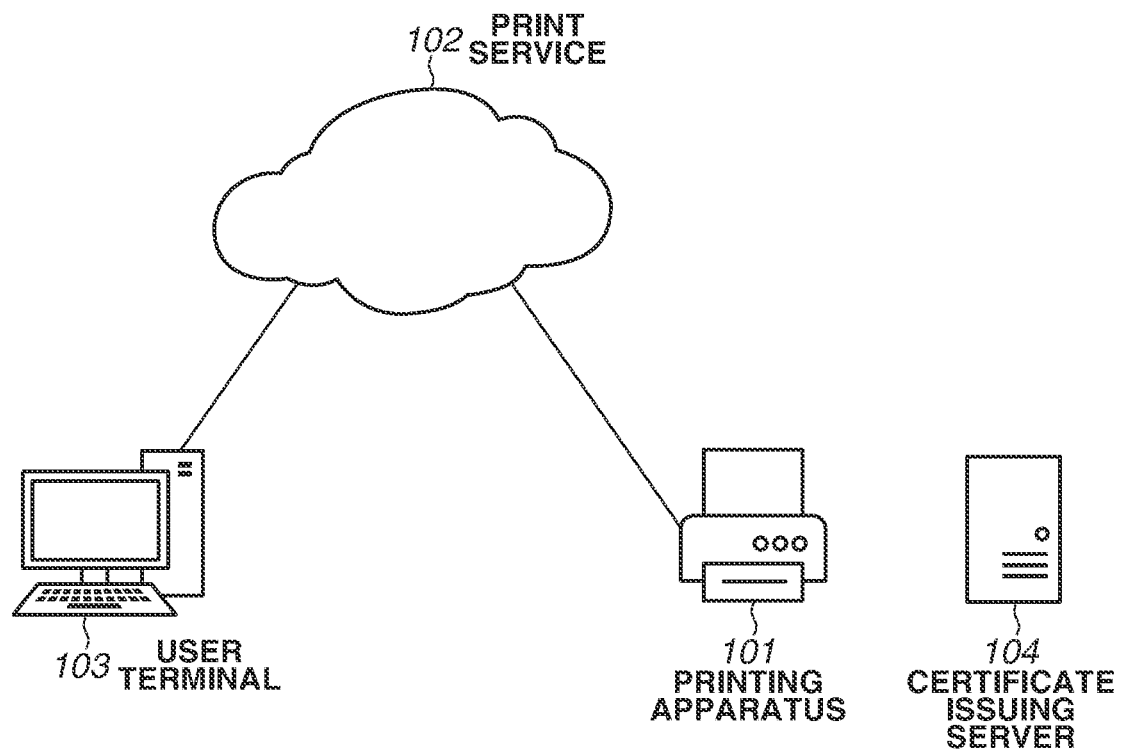
FIG. 1 illustrates a system configuration according to an exemplary embodiment.

FIG. 1 illustrates a configuration of a print system including a printing apparatus according to a first exemplary embodiment of the present disclosure. The present exemplary embodiment is applied to a printing apparatus 101. A print service 102 is provided on the Internet. A terminal 103 is operated by a user. The certificate issuing server 104 functions as a certificate issuing server. The printing apparatus 101 is registered with the print service 102 by an operation of an owner of the printing apparatus 101. The user selects the printing apparatus 101 registered with the print service 102 from the user terminal 103, and transmits print data to the print service 102. The printing apparatus 101 receives the print data transmitted from the user via the print service 102, and prints it.

The terminal of the user is not limited to the user terminal 103, and the user can use the print service 102 from a plurality of user terminals (not illustrated) such as a general-purpose personal computer and a smart-phone. The printing apparatus 101 and the user terminal 103 are connected to the print service 102 via the Internet. Further, the certificate issuing server 104 is a server that issues a certificate used for a purpose other than that of the print service 102, and does not have to be connected to the printing apparatus 101 via a network.

<Hardware Configuration of Printing Apparatus>

Figure 2:
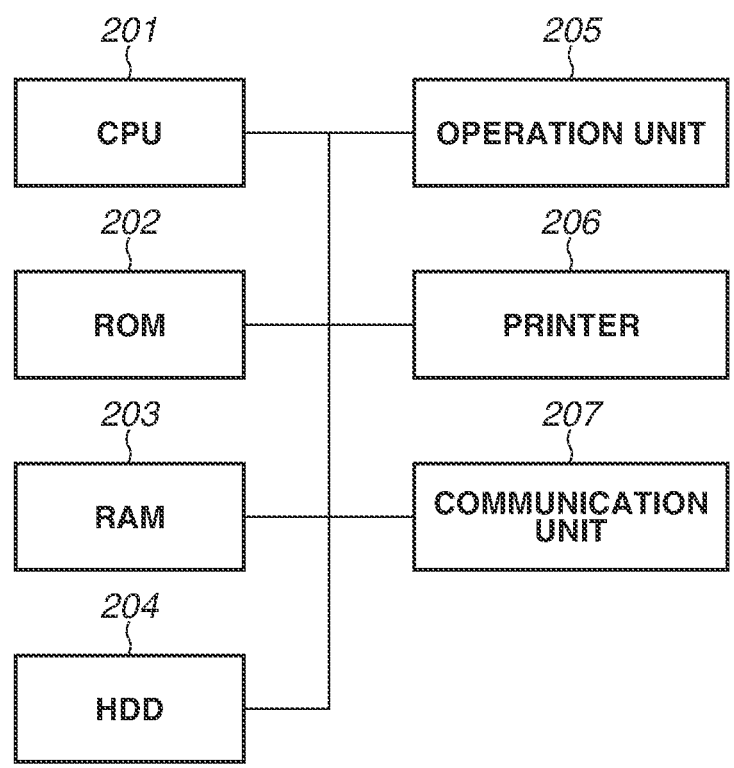
FIG. 2 is a block diagram illustrating a hardware configuration of a printing apparatus.

FIG. 2 is a block diagram schematically illustrating a hardware configuration of the printing apparatus 101. A central processing unit (CPU) 201 is a central processing device (processor) that controls the entire operation of the printing apparatus 101. A random access memory (RAM) 203 is a volatile memory, and is used as a work area and temporary storage area for loading various kinds of control programs stored in a read only memory (ROM) 202 and a hard disk drive (HDD) 204.

The ROM 202 is a nonvolatile memory, and stores a boot program of the printing apparatus 101 and the like. The HDD 204 is a large-capacity nonvolatile hard disk compared to the RAM 203. The HDD 204 stores a control program of the printing apparatus 101. Further, the HDD 204 also stores an operating system (OS) and an application program. Further, the HDD 204 also stores therein setting values of settings regarding various kinds of functions provided in the printing apparatus 101.

The CPU 201 executes the boot program stored in the ROM 202 when the printing apparatus 101 is started up. This boot program is used to read out the OS program stored in the HDD 204 and load it into the RAM 203. After executing the boot program, the CPU 201 subsequently executes the OS program loaded in the RAM 203, thereby controlling the printing apparatus 101. Further, the CPU 201 also stores data used for an operation by the control program in the RAM 203, and reads and writes this data.

The printing apparatus 101 is assumed to be configured in such a manner that the single CPU 201 performs each of processing procedures illustrated in sequences and flowcharts that will be described below, but may be configured in a different manner. For example, the printing apparatus 101 can also be configured in such a manner that a plurality of CPUs and microprocessors (microprocessing units (MPUs)) cooperates with one another to perform each of the processing procedures illustrated in the flowcharts that will be described below. Alternatively, the printing apparatus 101 may be configured in such a manner that a part of the processing that will be described below is performed using a hardware circuit, such as an application specific integrated circuit (ASIC) and a field-programmable gate array (FPGA).

An operation unit 205 is a display on which a touch operation can be performed. A printer 206 is a printer engine that prints print data received from outside via a communication unit 207. The communication unit 207 is a network interface for connecting to the Internet and a local area network (LAN) in the office. The user terminal 103 and the print service 102 also include hardware configurations similar to the CPU 201, the ROM 202, the RAM 203, and the HDD 204.

<Software Configuration>

Figure 3:
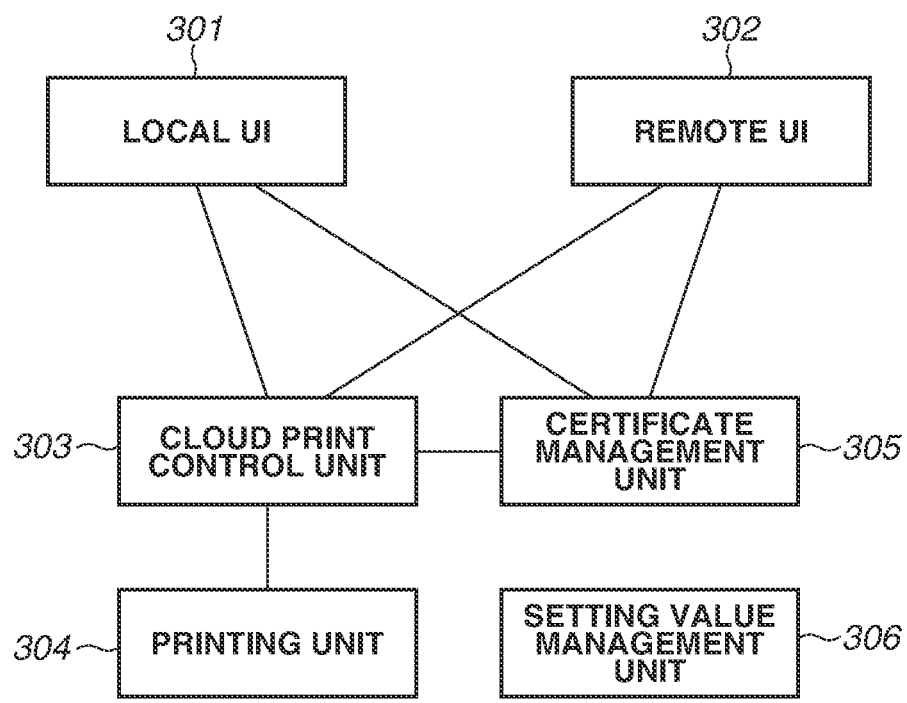
FIG. 3 is a block diagram illustrating a software configuration of the printing apparatus.

FIG. 3 is a block diagram schematically illustrating a software configuration of the printing apparatus 101, and illustrates a software configuration implemented by loading the program stored in the ROM 202 into the RAM 203 and executing the program by the CPU 201. A local user interface (UI) 301 provides a user interface that allows the user to change a setting and use a function of the printing apparatus 101 using the display of the operation unit 205. A remote UI 302 has a Hypertext Transfer Protocol (HTTP) server function, and provides a user interface configured by Hyper Text Markup Language (HTML) to the user. The user can access the remote UI 302 using the web browser on the user terminal 103 to change a setting and use a function of the printing apparatus 101.

A cloud print control unit 303 is a software module that implements a communication protocol and a function for supporting the print service 102. A printing unit 304 receives print data received by the cloud print control unit 303 from the print service 102, and performs the print processing by controlling the printer 206.

A certificate management unit 305 is a software module that performs processing regarding a certificate. More specifically, the certificate management unit 305 generates a secret key, a public key, and a CSR, which is a message to request a signature, and registers the certificate with the printing apparatus 101. When registering the certificate, the certificate management unit 305 also deletes the CSR corresponding to the certificate at the same time. The certificate and the CSR stored in the printing apparatus 101 can be referred to by accessing a "certificate and CSR list" screen formed by HTML via the remote UI 302, and the certificate management unit 305 also generates data in the HTML format therefor.

Figure 6:
FIG. 6 is a screen illustrating a state where CSRs are displayed on the user interface for the "certificate and CSR list" provided to the printing apparatus.
Figure 7:
FIG. 7 is a screen illustrating a state where a CSR and a certificate are displayed on the user interface for the "certificate and CSR list" provided to the printing apparatus.

FIGS. 6 and 7 each illustrate a screen example of the "certificate and CSR list" screen. FIG. 6 illustrates the screen with a CSR for Transport Layer Security (TLS) and a CSR for Internet Protocol Security (IPSec) displayed thereon. FIG. 7 illustrates the screen with a certificate for TLS and a CSR for IPSec displayed thereon. Display information displayed on the screen is the name of the CSR or the certificate, and indicates the name specified by the user when the CSR is generated or the certificate is registered. The display information is not limited to the name, and an identification (ID) or a number for identifying the CSR or the certificate may be employed as the display information. Further, in a case where the name is displayed as the display information, this name may be determined by the apparatus instead of being specified by the user.

A setting value management unit 306 is a software module that manages setting values of various kinds of functions of the printing apparatus 101. The setting value management unit 306 performs processing for exporting and importing the setting values in addition to changing the settings.

The user terminal 103 is equipped with a web browser (not illustrated) that transmits an HTML request and displays a screen based on data in the HTML format that is received as a response. Further, the print service 102 is equipped with a function of registering the printing apparatus 101 and a function of converting the print data specified to be printed from the user terminal 103 into a print job and providing the print job to a printing apparatus 101 selected among a plurality of registered printing apparatuses 101. These functions are functions provided also by the software configuration, and this software configuration is a software configuration implemented by loading the program stored in the ROM 202 into the RAM 203 and executing the program by the CPU 201.

<Flow of Registering Certificate with Printing Apparatus>

The local UI 301 and the remote UI 302 provide a user interface (not illustrated) that allows the user to register the certificate with the printing apparatus 101. Processing performed when the certificate is registered using this user interface will be described with reference to a sequence diagram illustrated in FIG. 4.

First, in step S401, the user instructs the printing apparatus 101 to generate a key pair (i.e., a combination of a secret key and a public key). In step S402, the certificate management unit 305 detects this generation instruction and generates a secret key, a public key, and a CSR.

Subsequently, in step S403, the user acquires the generated CSR by downloading it from the printing apparatus 101, and, then, requests the certificate issuing server 104 to issue a certificate by providing this CSR thereto. This request to issue the certificate is normally a manual work. After confirming the CSR, the certificate issuing server 104 issues a signed certificate and returns it in response to the request to issue the certificate. The present exemplary embodiment may be configured in such a manner that the user performs the procedure for issuing the certificate using the user terminal 103 in the procedure for issuing the certificate. In step S404, the user issues an instruction to register the received certificate with the printing apparatus 101. In step S405, the certificate management unit 305 of the printing apparatus 101 detects the instruction to register the certificate, and registers the certificate.

Figure 5:
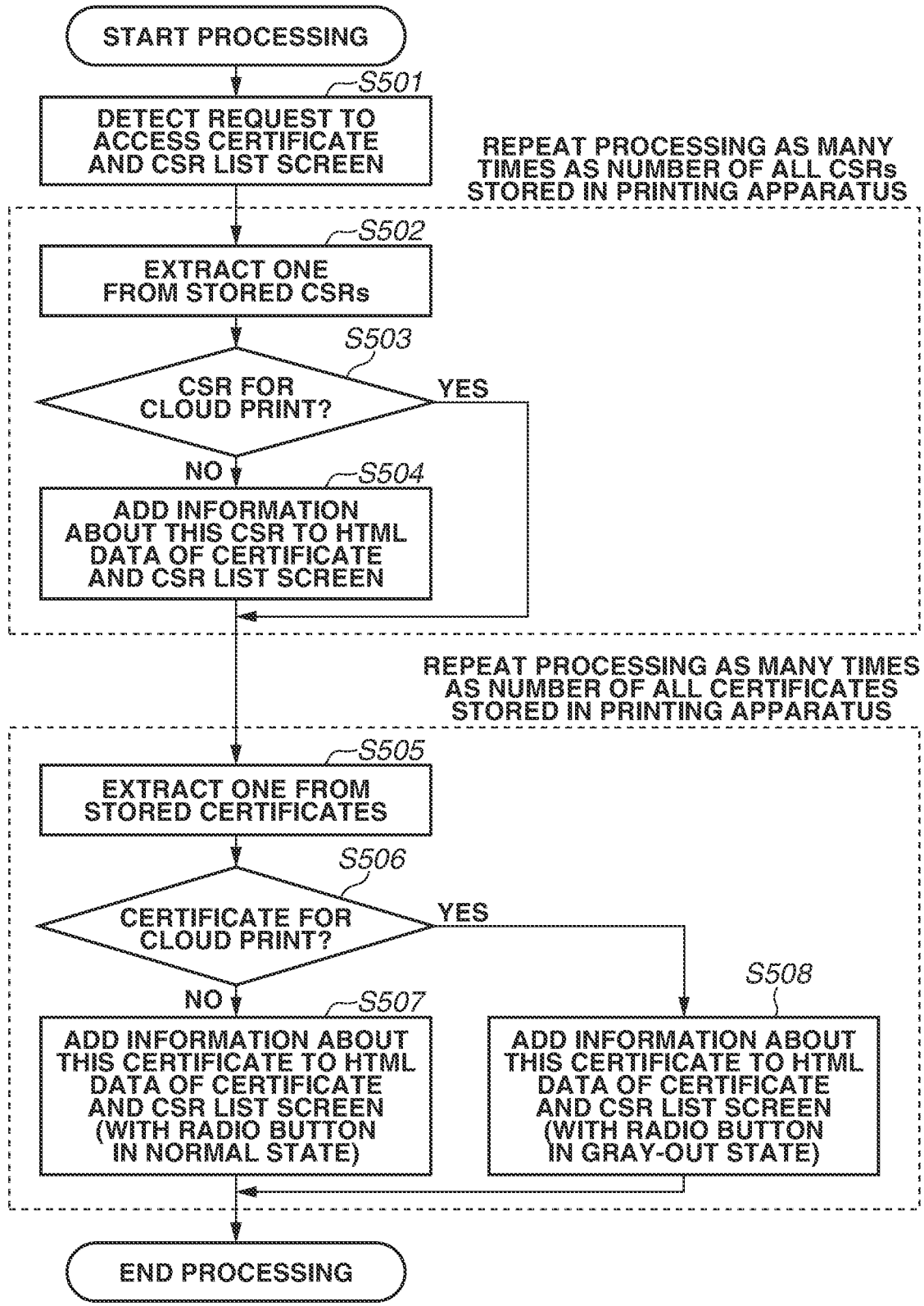
FIG. 5 is a flowchart illustrating processing performed when a user interface indicating a "certificate and certificate signing request (CSR) list" is displayed.

The local UI 301 and the remote UI 302 are each equipped with a user interface that displays the "certificate and CSR list", but this does not mean that all certificates and CSRs stored in the printing apparatus 101 are displayed. Which certificate and CSR are displayed under what kind of condition will be described with reference to a flowchart illustrated in FIG. 5. The processing illustrated in FIG. 5 is processing performed entirely by the certificate management unit 305.

First, in step S501, the certificate management unit 305 detects a request to access the certificate and CSR list screen from the user. Then, in step S502, the certificate management unit 305 extracts one of the CSRs stored in the printing apparatus 101. Then, in step S503, the certificate management unit 305 determines whether the extracted CSR is the CSR used to issue the certificate for the cloud print. As the determination method, for example, the certificate management unit 305 can make the determination based on whether a character string indicating the print service 102 is contained as issuer information contained in the CSR like a table 1 (described below). If the CSR is not the CSR for the cloud print as a result of the determination (NO in step S503), the processing proceeds to step S504. In step S504, the certificate management unit 305 adds information about this CSR to the HTML data so that this CSR is displayed on the certificate and CSR list screen. On the other hand, if the CSR is the CSR for the cloud print (YES in step S503), the certificate management unit 305 adds nothing to the HTML data, and the processing proceeds to step S505. The certificate management unit 305 performs the processing in steps S502 to S504 as many times as the number of all the CSRs stored in the printing apparatus 101.

Next, in step S505, the certificate management unit 305 extracts one from the certificates registered with the printing apparatus 101. Then, in step S506, the certificate management unit 305 determines whether the extracted certificate is the certificate for the cloud print. As the determination method, the certificate management unit 305 can make the determination based on, for example, whether issuer information contained in the certificate is a character string indicating the print service 102 similarly to the above-described CSR. If the certificate is not the certificate for the cloud print as a result of the determination (NO in step S506), the processing proceeds to step S507. In step S507, the certificate management unit 305 adds information about this certificate to the HTML data so that this certificate is displayed on the certificate and CSR list screen.

On the other hand, if the certificate is the certificate for the cloud print (YES in step S506), the processing proceeds to step S508. In step S508, the certificate management unit 305 adds data to the HTML data so that this certificate is displayed to display the radio button thereof in a gray-out state. Since the deletion of the certificate for the cloud print makes it impossible to carry out printing using the print service 102 thereafter, this display is a measure for avoiding such a situation. Displaying the radio button in the gray-out state prohibits this certificate from being selected, thereby also prohibiting it from being deleted. Then, the processing for displaying the certificate is completed by repeating the processing in steps S505 to S508 as many times as the number of all the certificates registered with the printing apparatus 101.

The certificate management unit 305 may operate so as to refrain from adding the information about the certificate for the cloud print to the HTML data instead of displaying the certificate with the radio button set in the gray-out state in step S508. This is because the certificate for the cloud print can be renewed in a renewal setting of the client certificate as will be described below, and therefore does not necessarily have to be displayed on the certificate and CSR list screen. Besides graying out or refraining from displaying the certificate for the cloud service, there is also another method of imposing a restriction to prohibit the deletion even when the user selects it and issues an instruction to delete it. However, in this case, whether the certificate is the certificate for the cloud print needs to be determined at the timing of receiving the deletion instruction.

<Flow of Registering Printing Apparatus from Remote UI 302>

Figure 8:
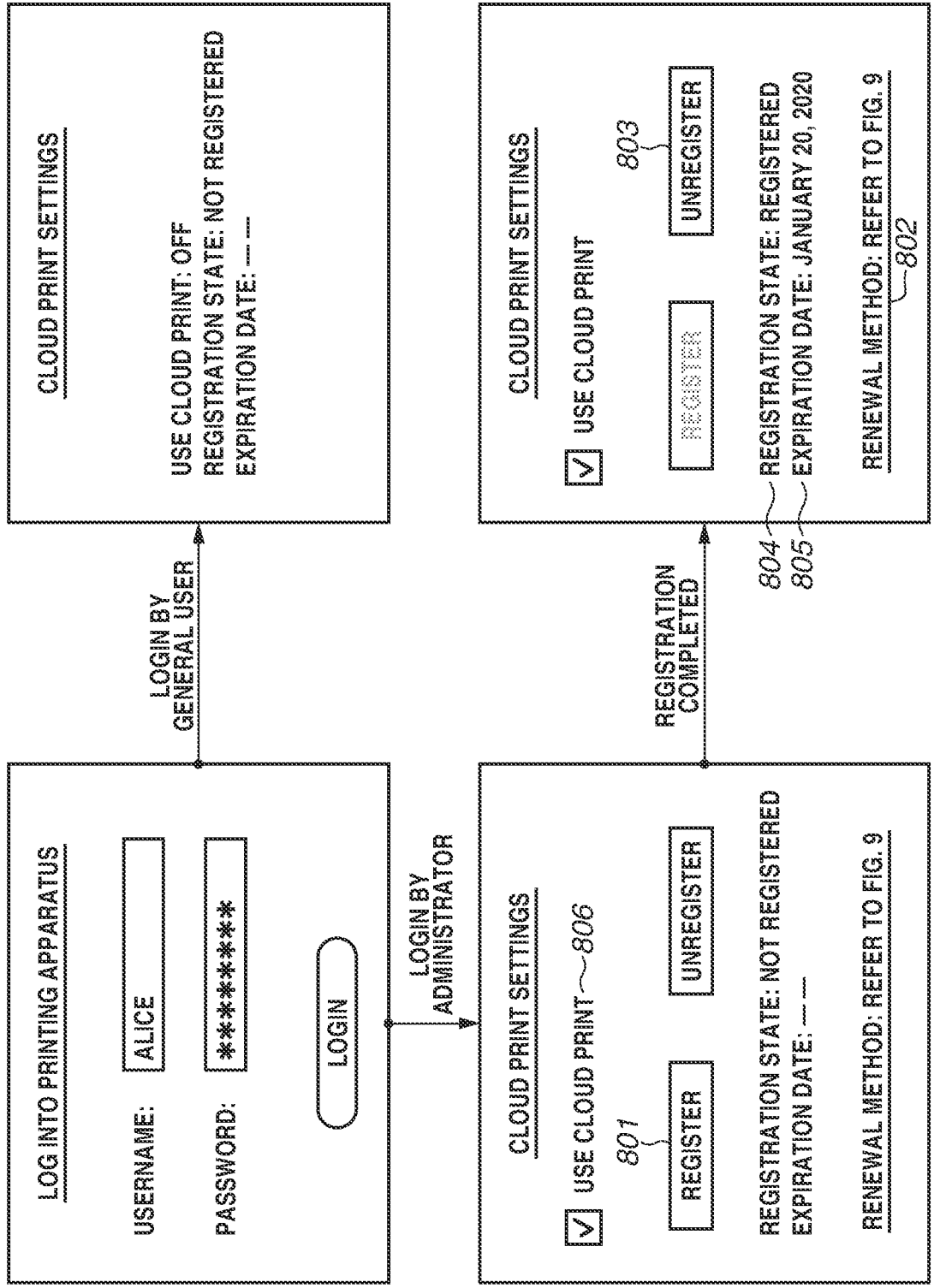
FIG. 8 illustrates a user interface for cloud print settings provided to the printing apparatus.

The local UI 301 and the remote UI 302 provide a user interface that allows the user to register the printing apparatus 101 with the print service 102, renew the registration, and unregister the printing apparatus 101. FIG. 8 illustrates this user interface. The user interface illustrated in FIG. 8 is provided by both the local UI 301 and the remote UI 302, and the owner and the administrator of the printing apparatus 101 can operate the user interface from any of the UIs. A registration button 801 is used to perform the processing for registering the printing apparatus 101 with the print service 102.

The user interface of the cloud print setting screen illustrated in FIG. 8 is presented only when the administrator logs in to the printing apparatus 101 from a login screen displayed on the local UI 301 or the remote UI 302. When a general user logs in, this user can only view the items of the cloud print settings. A check box 806 is used for the user to select whether to use the cloud print. The selected state of the check box 806 is stored in the HDD 204 as the setting. The user using the cloud print performs the operation of registering the printing apparatus 101 with the print service 102 after checking the check box 806.

Figure 9:
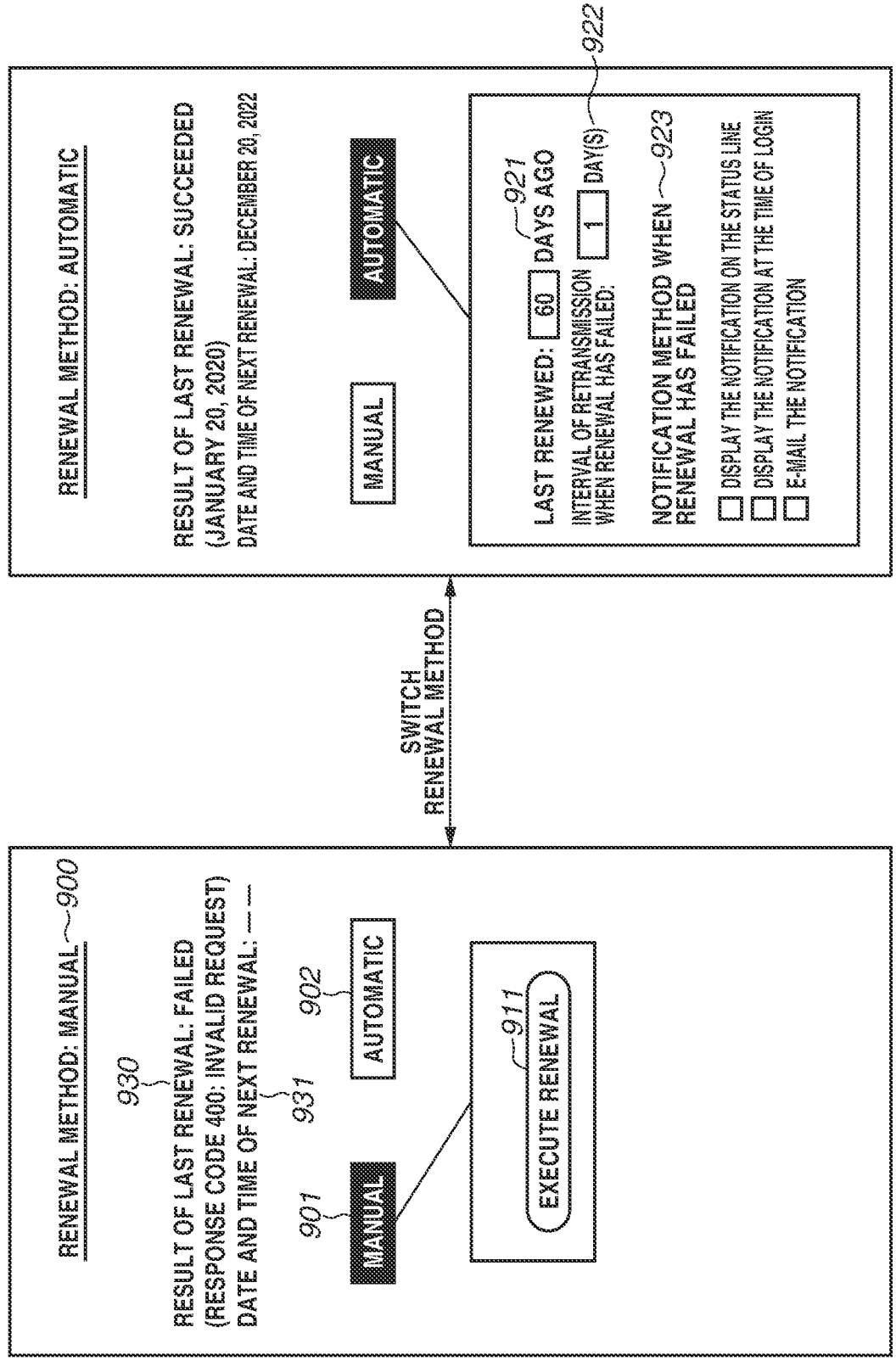
FIG. 9 illustrates user interfaces for renewal settings provided to the printing apparatus.

A button 802 is used to transition to a screen illustrated in FIG. 9 for renewing the client certificate. The button 802 may be replaced with a renewal execution button 911, which will be described below. In this case, the client certificate is renewed by a manual renewal. A button 803 is used to unregister the printing apparatus 101 registered through the registration flow, and the printing apparatus 101 transmits an unregistration request to the print service 102 in response to pressing of the button 803. The printing apparatus 101 will be described as being configured to transition from FIG. 8 to FIG. 9 in the first exemplary embodiment, but may be configured to display the settings regarding the renewal together with the screen of the cloud print settings. Both the screens illustrated in FIGS. 8 and 9 are screens for configuring the settings regarding the print service 102.

Figure 10:
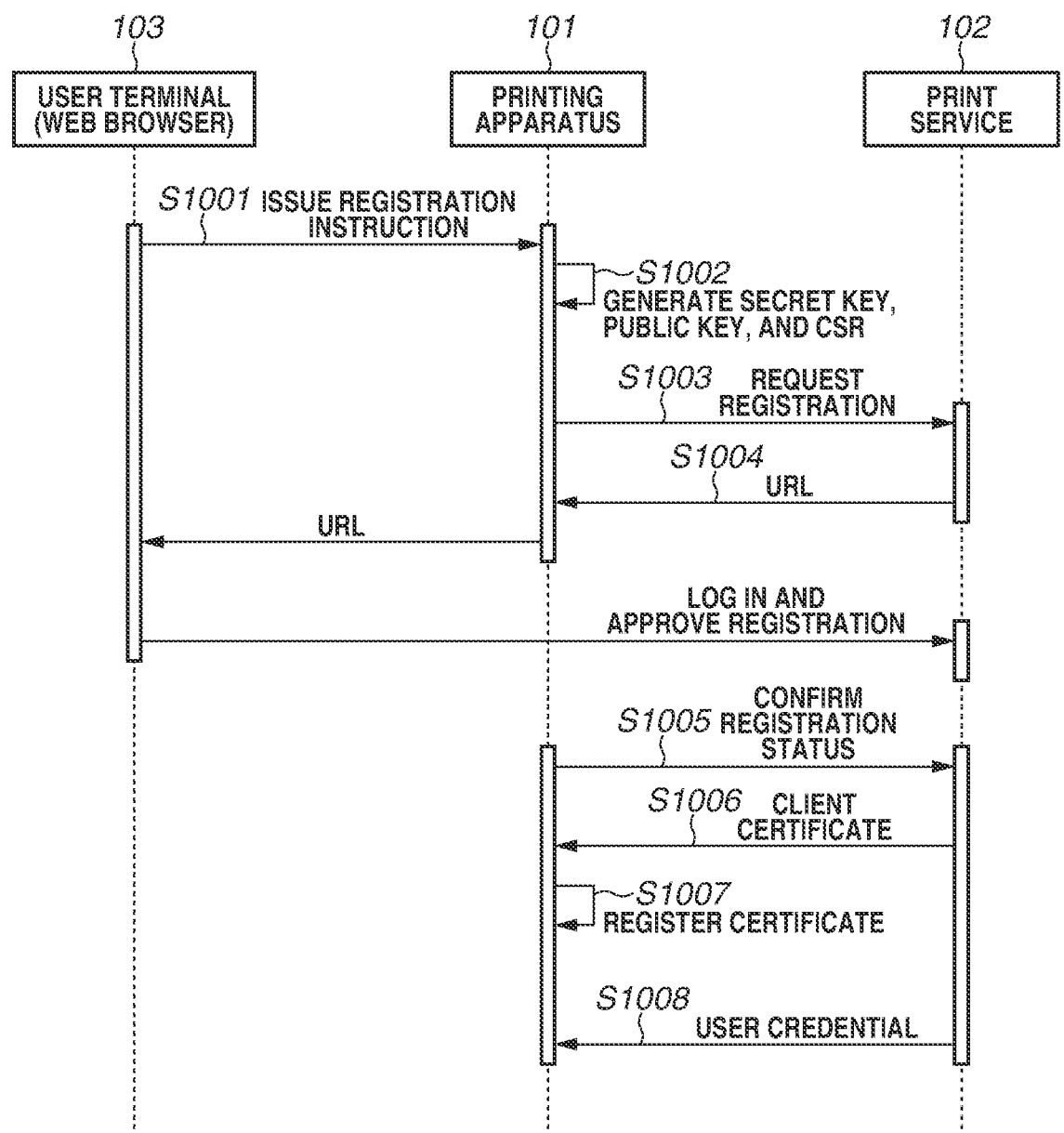
FIG. 10 is a sequence diagram illustrating a sequence performed when the printing apparatus is registered with a print service.

The flow of the registration processing performed when the remote UI 302 is used will be described with reference to a sequence diagram illustrated in FIG. 10. When the user uses the remote UI 302, the user logs in to the printing apparatus 101 from the remote UI 302 and the printing apparatus 101 displays the cloud print setting screen generated using HTML (FIG. 8). In step S1001, the user issues the instruction for the registration by pressing the registration button 801. In step S1002, the cloud print control unit 303 of the printing apparatus 101 detects it, and generates the pair of secret key and public key, and the CSR and stores them into the HDD 204.

Information for identifying the applicant and the generated public key are contained in the CSR. Examples of the information for identifying the applicant to be contained in the CSR include the common name, the name of the organization, the name of the department, the address, and the country code. The printing apparatus 101 uses the printer name "Printing Apparatus 101" as the common name. The printing apparatus 101 uses default values stored in the printing apparatus 101 since it has been shipped from the factory as the name of the organization, the name of the department, the address, and the country code. In step S1003, the printing apparatus 101 transmits a registration request to the print service 102 together with the CSR. This means that the generation of the CSR for the cloud print and the issuance of the certificate are carried out in parallel with the registration processing by being triggered by the registration of the printing apparatus 101 with the print service 102. In other words, the user can cause the printing apparatus 101 to be registered and the certificate to be issued only by issuing the registration instruction.

The configuration information of the printing apparatus 101 is contained in the registration request, and examples thereof include the printer name, the model name, the mounted unit, and information regarding the printing capability such as monochrome/color of the printing apparatus 101. In step S1004, the print service 102 generates a Uniform Resource Locator (URL) for the registration for the printing apparatus 101 in response to receiving the registration request, and transmits it to the printing apparatus 101. The printing apparatus 101 is not yet registered with the print service 102 at this time point. When receiving the printer registration from the printing apparatus 101, the print service 102 issues a client certificate, which will be described below. The following table indicates the information contained in the client certificate issued from the print service 102 to the printing apparatus 101.

TABLE 1

| Item | Value |
| --- | --- |
| Version | V3 |
| Serial Number | 123456789 |
| Issuer | CN = Print Service 102 |
| User Identifier | CN = Printing Apparatus 101 |
| Start of Valid Period | Jan. 20, 2018 |
| End of Valid Period | Jan. 20, 2020 |
| Pubic Key | 30 82 01 0a 02 . . . |
| Signature Algorithm | SHA246-RSA |
| Signature | 36 79 ca 35 66 87 72 . . . |

The version indicates the version of X509, which is the format of the certificate. The serial number is the serial number assigned to the certificate issued by the print service 102. The issuer is the identifier of the print service 102, which is the issuer of the certificate. The user identifier is the identifier of the printing apparatus 101, which is the requester requesting the issuance of the certificate. The start of the valid period indicates the date when the use of the certificate is started. The end of the valid period indicates the expiration date at which the use period of the certificate expires. Hereinafter, the end of the valid period will be simply referred to as the expiration date. The public key is the public key added to the CSR by the printing apparatus 101. The signature algorithm is the algorithm of the signature on the certificate. The signature is the digital signature appended to the certificate by the print service 102, which is the issuer. The signature is signed with a secret key owned by the print service 102.

Figure 4:
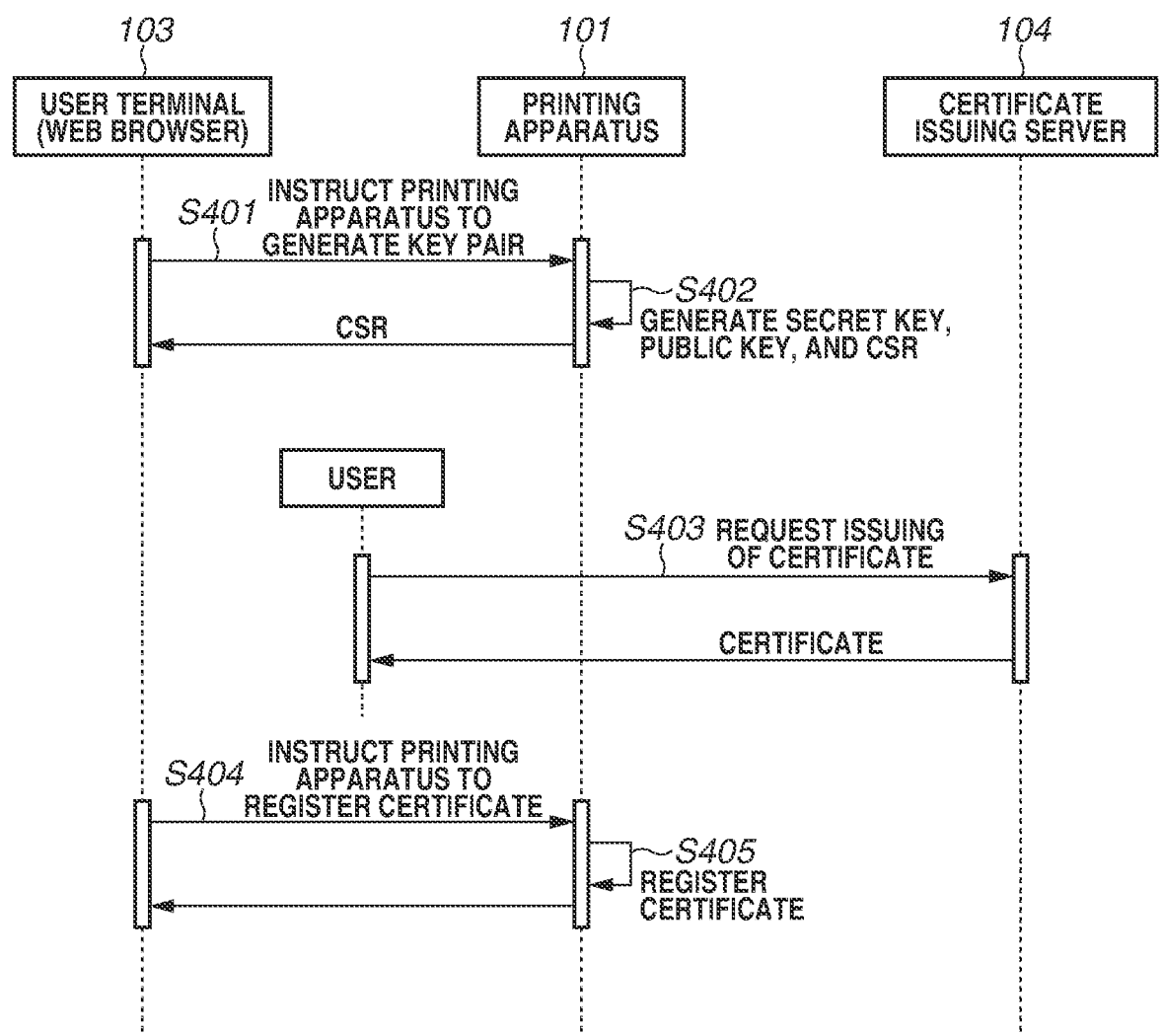
FIG. 4 is a sequence diagram illustrating a sequence performed when a certificate is registered with the printing apparatus.
Figure 11:
FIG. 11 illustrates the user interface of the "certificate and CSR list" before the printing apparatus is registered with the print service.

FIG. 11 illustrates a screen example of the certificate and CSR list screen at this time. FIG. 11 illustrates the example in a state assuming that the screen is in a state that another user is setting IPSec concurrently with the registration of the printing apparatus 101. The CSR not intended for the cloud print is displayed but the CSR for the cloud print is not displayed as indicated by the processing illustrated in the flowchart of FIG. 5, which has been described above. The CSR for IPSec illustrated in FIG. 11 is not the certificate for the cloud print used to cooperate with the print service 102, and is a certificate used when, for example, encrypted communication is carried out with the PC owned by the user. The flow of the generation of the CSR and the issuance of the certificate not intended for the cloud print is as illustrated in FIG. 4, and a difference thereof from FIG. 10 illustrating the generation of the CSR and the issuance of the certificate for the cloud print lies in the processing until the issuance. The generation of the CSR and the issuance of the certificate for the cloud print are characterized by being processed as a part of the registration processing of the print service 102 in parallel therewith.

The first exemplary embodiment is an example when the print service 102 has the function of issuing the certificate, but the print service 102 may issue the certificate using a certificate issuance service of a third party. In the case where the print service 102 uses the certificate issuance service of the third party, the identifier and the signature of the issuer are of the identifier and the signature of the certificate issuance service of the third party.

The printing apparatus 101 displays the received URL on the local UI 301 and prompts the user to access the URL for the registration of the printing apparatus 101. The printing apparatus 101 may allow the URL to be read by a camera such as a smart-phone by displaying the URL in the form of an encoded quick response (QR) code (registered trademark). Alternatively, the printing apparatus 101 may instruct the printing unit 304 to print the URL or the QR code, thereby printing and outputting the URL on paper.

The user accesses the above-described URL using the web browser on the user terminal 103. When the user accesses the URL using the web browser on the user terminal 103, a screen for logging in to a website (not illustrated) is displayed and a login is requested. When the user logs in by inputting the login account for the website, next, a user interface requesting the approval of the registration of the printing apparatus 101 is displayed.

The printing apparatus 101 provides a link to the URL acquired from the print service 102 on the web browser of the user terminal 103 by HTML. Alternatively, the printing apparatus 101 may transmit a redirection request so as to cause the web browser of the user terminal 103 to be redirected to the URL acquired from the remote UI 302 without displaying a user link button on the screen displayed on the web browser and causing the user to press this button.

In step S1005, the printing apparatus 101 periodically accesses the print service 102 and confirms the approval status of the registration. If the registration is approved because of a success in the login from the user terminal 103 to the print service 102, in step S1006, the print service 102 returns the client certificate in the X509 format, which is issued for the printing apparatus 101, to the printing apparatus 101. The printing apparatus 101 starts the confirmation of the approval status of the registration after step S1004, and repeatedly attempts it until the acquisition of the client certificate succeeds, the printing apparatus 101 is notified that the approval is canceled from the print service 102, or a predetermined period has elapsed.

Figure 12:
FIG. 12 illustrates the user interface of the "certificate and CSR list" after the printing apparatus is registered with the print service.

In step S1007, if successfully receiving the client certificate, the cloud print control unit 303 of the printing apparatus 101 stores it into the HDD 204. At this time, the cloud print control unit 303 deletes the CSR stored in the printing apparatus 101. FIG. 12 illustrates a screen example of the certificate and CSR list screen as a result thereof. FIG. 12 illustrates the screen with the certificate for the cloud print displayed thereon together with the grayed-out radio button as indicated by the processing illustrated in the flowchart of FIG. 5, which has been described above.

Further, the cloud print control unit 303 stores a registration state 804 of the printing apparatus 101 as "registered", and completes the registration processing. Further, when displaying the user interface illustrated in FIG. 8, the cloud print control unit 303 acquires the expiration date written in the client certificate and displays it as an expiration date 805 of the cloud print. Further, in step S1008, after the completion of the registration processing, the print service 102 returns to the printing apparatus 101 a user credential of the user that has approved the registration. This user credential is used when the client certificate is renewed using a user interface for the renewal settings illustrated in FIG. 9.

<Printing Flow>

Figure 13:
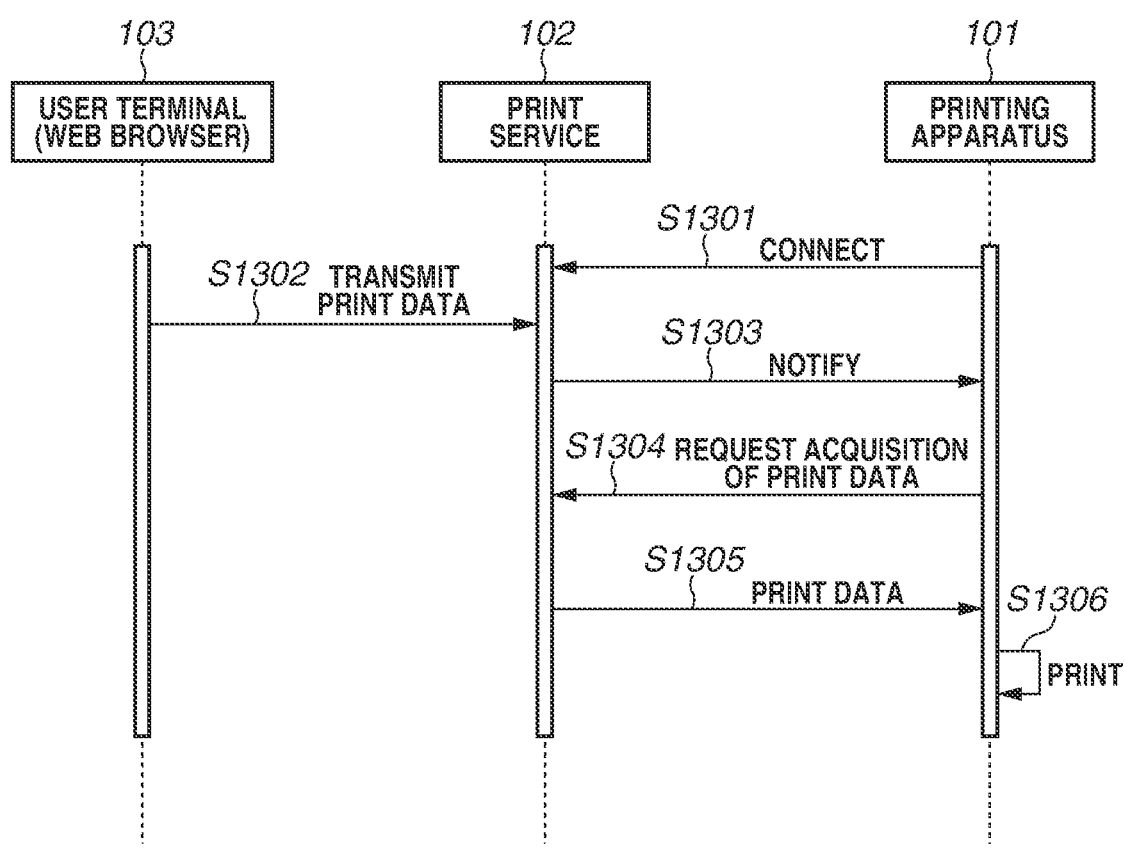
FIG. 13 is a sequence diagram illustrating a sequence of printing.

A flow performed when the user prints the print data through the printing apparatus 101 from the user terminal 103 via the print service 102 will be described with reference to a sequence diagram illustrated in FIG. 13. In step S1301, the cloud print control unit 303 of the printing apparatus 101 detects that the cloud print function is enabled, and connects to the print service 102. The cloud print control unit 303 determines whether the cloud print function is enabled or disabled by determining that the cloud print function is enabled if the illustrated check box 806 is in the selected state and the registration state 804 is also set to "registered", and otherwise determining that the cloud print function is disabled.

When connecting to the print service 102, the printing apparatus 101 presents the client certificate to the print service 102 and is authenticated by the print service 102. More specifically, the print service 102 verifies the digital signature appended to the client certificate, and confirms that this certificate is a legitimate certificate. Further, the print service 102 attempts to decrypt an encrypted message contained in the communication in step S1301 using the public key of the printing apparatus 101 that is contained in the certificate. If having succeeded in correctly decrypting it, the print service 102 confirms that this client is a legitimate client having the secret key of the printing apparatus 101, thereby authenticating the printing apparatus 101.

In step S1302, the user specifies the printing apparatus 101 registered with the print service 102 and transmits the print data to the print service 102 from the user terminal 103. For example, the web browser supporting the print service 102 is installed in the user terminal 103, and the user can select the printing apparatus 101 registered with the print service 102 from a print menu on the web browser.

In step S1303, the print service 102 generates a print job that receives the print data from the user terminal 103 and issues a notification for notifying the printing apparatus 101 of the presence of the print job using the connection established in step S1301. At this time, the method for notifying the printing apparatus 101 also comes in two types, a push notification and a pull notification. An immediate notification using the push notification can be used if the session is maintained between the print service 102 and the printing apparatus 101.

On the other hand, the pull notification is used if the session is not maintained and the printing apparatus 101 accesses the print service 102 periodically or when an event has occurred. In step S1304, the notified printing apparatus 101 requests the acquisition of the print data contained in the print job to the print service 102. In step S1305, the print service 102 returns the print data to the printing apparatus 101 in response thereto. In step S1306, the cloud print control unit 303 of the printing apparatus 101 transfers the received print data to the printing unit 304, thereby performing the print processing. At this time, the notified printing apparatus 101 may achieve immediate printing by transmitting the request to acquire the data immediately, or may transmit the request to acquire the data at the timing when the user logs in to the printing apparatus 101. The print data acquired in step S1305 may be the print data transmitted from the user terminal 103 in step S1302, but may also be, for example, print data converted into data in another format by the print service 102.

<Settings of Renewal of Client Certificate>

FIG. 9 illustrate screens for setting the method for renewing the client certificate of the printing apparatus 101. The renewal method comes in two types, a manual renewal 901 and an automatic renewal 902. If selecting "manual", the user can press the renewal execution button 911 at an arbitrary timing, and issues the renewal instruction thereby. If selecting "automatic", the user can set a next renewal timing 921 about when to perform the renewal processing, an interval 922 of retransmission when the renewal has failed, and a method 923 for notifying the user.

Instead of allowing the user to set these setting items, values predefined in the printing apparatus 101 may be used as these setting items. The settings "manual" and "automatic" are mutually exclusive settings, and "manual" is assumed to be selected by default. This is due to such a security concern that, if "automatic" is set by default, the renewal operation requiring the administrator authority is unintentionally performed in the background even when the administrator does not want the automatic renewal. A change in the present setting may be allowed to be set by anyone that is a user having the administrator authority or may be allowed to be set only by the user who has registered the printing apparatus 101 with the print service 102 first. The present exemplary embodiment has been described above assuming that the printing apparatus 101 is equipped with the function of automatically renewing the certificate, but the same also applies to even when the certificate is manually renewed.

The CSR and the certificate for the cloud print are data that becomes necessary in the course of using the print service 102, and therefore do not necessarily have to be recognized by the user or operated by the user. According to the first exemplary embodiment, the CSR and the certificate for the cloud print can be prevented from being handled while being mixed up with the CSR and the certificate not intended for the cloud print. As a result, the user can save time and effort regarding the handling of the CSR and the certificate.

The printing apparatus 101 may be equipped with a function of exporting the setting values and importing them to the same printing apparatus 101 as the printing apparatus 101 that has conducted the export or another printing apparatus 101 for the purpose of, for example, improving the convenience for setup when the printing apparatus 101 is set up again at the time of occurrence of a failure or when a plurality of apparatuses is set up. In this case, it is desirable to also target the setting values regarding the cloud print function for the export and import, and the targeted setting values also include the certificate related to the cloud print function in addition to the setting values of the cloud print function itself.

However, the client certificate for the cloud print should not be imported to an apparatus other than the same printing apparatus 101. This is because the client certificate is supposed to be issued to the individual printing apparatus 101 by the print service 102. If another printing apparatus 101 uses this client certificate, this means that the other printing apparatus 101 impersonates the original printing apparatus 101, thereby leading to a security concern. This raises the necessity of such a mechanism that the certificate for the cloud print is prevented from being imported to another printing apparatus 101 different from the printing apparatus 101 that has conducted the export.

A second exemplary embodiment will be described regarding this mechanism. This mechanism will be described in the order of the export and the import, first focusing on the export. The remote UI 302 provides a user interface that allows the user to export the settings of the printing apparatus 101. The export processing will be described with reference to this user interface illustrated in FIG. 14 and a sequence diagram illustrated in FIG. 16 performed when the export is conducted.

Figure 14:
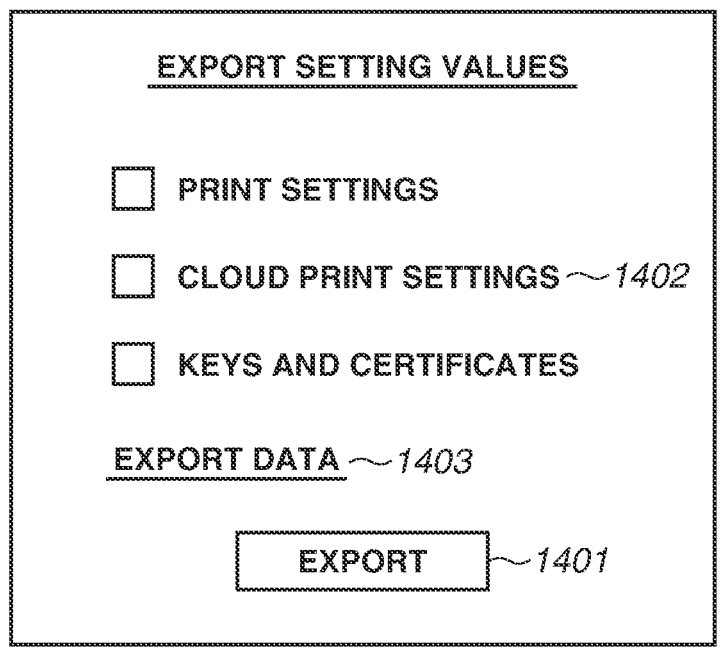
FIG. 14 illustrates a user interface for a setting value export function provided to the printing apparatus.

First, the user displays using the remote UI 302 a setting value export screen formed by HTML illustrated in FIG. 14. In step S1601, the user issues an export instruction by selecting a check box from check boxes 1402 of the settings that the user wants to export, and pressing an export button 1401. FIG. 14 illustrates the screen with three settings lined up as the check boxes 1402 thereon, but another setting may also be added thereto.

In step S1602, the setting value management unit 306 of the printing apparatus 101 detects the pressing of the export button 1401 and conducts the export. More specifically, the setting value management unit 306 generates a file containing the checked setting values according to the checked state of the check box 1402. Upon completing the generation of the file, the setting value management unit 306 notifies the remote UI 302 of that. The notification method may be a method using a standard mechanism for an event notification to a web application, or employable methods also include a method that confirms whether the file generation is completed by periodically polling the setting value management unit 306 from the remote UI side. Then, the user can download the file containing the setting values (export data) by clicking a character string 1403 with a link placed thereon on the setting value export screen in FIG. 14.

Subsequently, the import will be described. The remote UI 302 provides a user interface that allows the user to import the settings of the printing apparatus 101. The import processing will be described with reference to this user interface illustrated in FIG. 15 and a sequence diagram illustrated in FIG. 17 performed when the import is conducted. There are two possibilities for the printing apparatus 101 conducting the import, which is the printing apparatus 101 that has conducted the export and a printing apparatus 101 other than that. The import processing will be described first focusing on the example of when the settings are imported to the printing apparatus 101 that has conducted the export.

To determine whether the printing apparatus 101 conducting the import is the printing apparatus 101 that has conducted the export or a printing apparatus 101 other than that, a serial number can be used as identification information that allows the printing apparatus 101 to be uniquely identified. More specifically, a serial number is set to the printing apparatus 101 and stored in the HDD 204 or other memories in advance, and this serial number is added to the export data. Then, the serial number of the printing apparatus 101 and the serial number in the export data are compared at the time of the import, and the printing apparatus 101 conducting the import can be determined to be the same printing apparatus 101 if the serial numbers match each other and determined to be another printing apparatus 101 if the serial numbers do not match each other.

Figure 15:
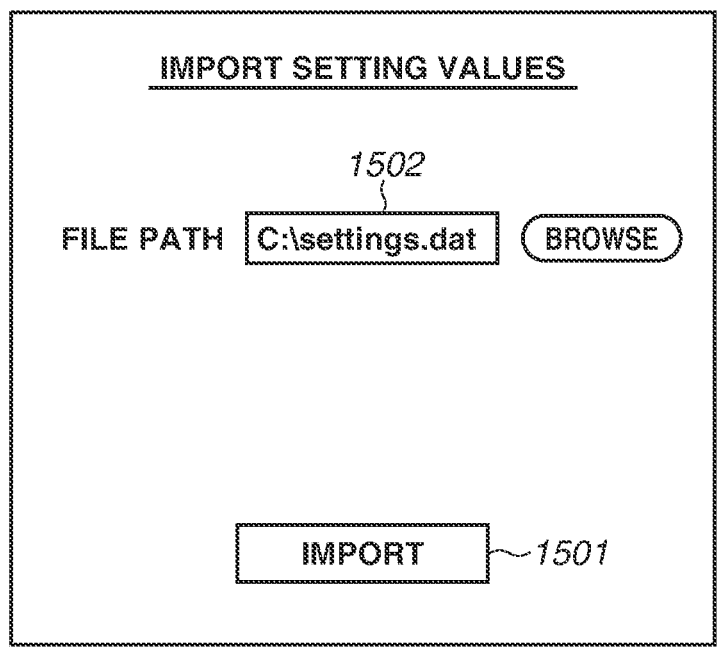
FIG. 15 illustrates a user interface for a setting value import function provided to the printing apparatus.

The user displays a setting value import screen illustrated in FIG. 15 formed by HTML using the remote UI 302. The user inputs the path indicating the location storing the export data acquired from the export in a field 1502. Then, in step S1701, the user issues an import instruction by pressing an import button 1501. In step S1702, the setting value management unit 306 of the printing apparatus 101 detects the instruction and conducts the import. More specifically, the setting value management unit 306 extracts the setting value from the input export data and stores it into a predetermined location in the HDD 204. At this time, regarding the keys and certificates, the setting value management unit 306 stores all the keys and certificates including the key and certificate for the cloud print and the key and certificate for purposes other than the cloud print into the HDD 204.

Subsequently, the import processing will be described regarding the example of when the settings are imported to the printing apparatus 101 different from the printing apparatus 101 that has conducted the export. In step S1703, the user issues the import instruction by pressing the import button 1501. In step S1704, the setting value management unit 306 detects it and conducts the import. This flow is the same as that performed when the settings are imported to the printing apparatus 101 that has conducted the export. A difference is how the keys and certificates are handled. Regarding the keys and certificates, the setting value management unit 306 stores only the key and certificate for other than the cloud print into the HDD 204 and refrains from storing the key and certificate for the cloud print into the HDD 204. This processing realizes the prevention of the storage of the key and certificate for the cloud print into another printing apparatus 101.

In this manner, according to the second exemplary embodiment, in the case where the printing apparatus 101 is equipped with the function of importing the certificate for the cloud print, the printing apparatus 101 becomes able to prevent another printing apparatus 101 from impersonating this printing apparatus 101 by using the certificate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-155426, filed Aug. 28, 2019, which is hereby incorporated by reference herein in its entirety.

What is claimed is:

1. A printing apparatus comprising:
a communication unit configured to communicate with a system including a print service that provides a service regarding printing via the Internet;
a display unit configured to display first display information for identifying a signing request necessary to issue a certificate and second display information for identifying the issued certificate;
a transmission unit configured to transmit a request to register the printing apparatus and the signing request necessary to issue the certificate of the printing apparatus to the system upon receiving a registration instruction for registering the printing apparatus with the print service from a user; and
an export unit configured to add identification information of the printing apparatus to a plurality of certificates including the certificate, and export the plurality of certificates,
wherein the display unit refrains from displaying third display information for identifying the signing request transmitted by the transmission unit, and
wherein the certificate received from the system is stored in the printing apparatus that imports the plurality of certificates in a case where the identification information of the plurality of certificates to be imported and the identification information of the printing apparatus that imports the plurality of certificates match each other, and the certificate received from the system is not stored in the printing apparatus that imports the plurality of certificates in a case where the identification information of the plurality of certificates to be imported and the identification information of the printing apparatus that imports the plurality of certificates do not match each other.

2. The printing apparatus according to claim 1, wherein, after the printing apparatus is registered and the certificate is received from the system as a response to the transmission by the transmission unit, the display unit refrains from displaying fourth display information for identifying the received certificate.

3. The printing apparatus according to claim 1, wherein, after the printing apparatus is registered and the certificate is received from the system as a response to the transmission by the transmission unit, the display unit displays fourth display information for identifying the received certificate so as to indicate that the certificate cannot be deleted when displaying the fourth display information.

4. The printing apparatus according to claim 1, wherein the display unit first displays the first display information, and, after receiving the certificate, stops displaying the first display information and instead displays the second display information for identifying the received certificate.

5. The printing apparatus according to claim 1, wherein the signing request of the first display information and the certificate of the second display information are not related to the print service.

6. The printing apparatus according to claim 1, wherein the display unit displays at least one screen to perform a setting regarding the print service, the at least one screen being a setting regarding an automatic renewal of the certificate received from the system, and
wherein the certificate is automatically renewed based on a setting value set via the screen.

7. The printing apparatus according to claim 1, further comprising:
a printing unit configured to
transmit to the print service the certificate received from the system,
receive a print job from the print service, and
print the print job upon success in authentication of the printing apparatus, after the printing apparatus is registered with the print service.

8. The printing apparatus according to claim 1, further comprising:
an import unit configured to import the plurality of certificates, wherein the import unit refrains from, when importing the plurality of certificates, storing the certificate received from the system and stores the certificate(s) other than the certificate received from the system.

9. A method for controlling a printing apparatus, the method comprising:

communicating with a system including a print service that provides a service regarding printing via the Internet;

displaying first display information for identifying a signing request necessary to issue a certificate and second display information for identifying the issued certificate;

transmitting a request to register the printing apparatus and the signing request necessary to issue the certificate of the printing apparatus to the system upon receiving a registration instruction for registering the printing apparatus with the print service from a user; and adding identification information of the printing apparatus to a plurality of certificates including the certificate, and exporting the plurality of certificates, wherein third display information for identifying the transmitted signing request is not displayed in the displaying, and wherein the certificate received from the system is stored in the printing apparatus that imports the plurality of certificates in a case where the identification information of the plurality of certificates to be imported and the identification information of the printing apparatus that imports the plurality of certificates match each other, and the certificate received from the system is not stored in the printing apparatus that imports the plurality of certificates in a case where the identification information of the plurality of certificates to be imported and the identification information of the printing apparatus that imports the plurality of certificates do not match each other.

10. A non-transitory storage medium storing a program including instructions, which when executed by a printing apparatus, cause the printing apparatus to perform operations comprising:

communicating with a system including a print service that provides a service regarding printing via the Internet;

displaying first display information for identifying a signing request necessary to issue a certificate and second display information for identifying the issued certificate;

transmitting a request to register the printing apparatus and the signing request necessary to issue the certificate of the printing apparatus to the system upon receiving a registration instruction for registering the printing apparatus with the print service from a user; and adding identification information of the printing apparatus to a plurality of certificates including the certificate, and exporting the plurality of certificates, wherein the printing apparatus refrains from displaying third display information for identifying the transmitted signing request in the displaying, and wherein the certificate received from the system is stored in the printing apparatus that imports the plurality of certificates in a case where the identification information of the plurality of certificates to be imported and the identification information of the printing apparatus that imports the plurality of certificates match each other, and the certificate received from the system is not stored in the printing apparatus that imports the plurality of certificates in a case where the identification information of the plurality of certificates to be imported and the identification information of the printing apparatus that imports the plurality of certificates do not match each other.

* * * * *